United States Patent

Hasegawa

Patent Number: 4,666,691
Date of Patent: May 19, 1987

[54] PROCESS FOR MANUFACTURING URANIUM OXIDE POWDER

[75] Inventor: Shinichi Hasegawa, Ibaraki, Japan

[73] Assignee: Mitsubishi Nuclear Fuel Co., Ltd., Tokyo, Japan

[21] Appl. No.: 731,984

[22] Filed: May 8, 1985

[30] Foreign Application Priority Data

May 9, 1984 [JP] Japan ................................. 59-91034

[51] Int. Cl.$^4$ ...................... C01G 43/025; C01G 43/01
[52] U.S. Cl. .................................... 423/260; 423/261; 423/253
[58] Field of Search ...................... 423/253, 260, 261

[56] References Cited

U.S. PATENT DOCUMENTS

| | | | |
|---|---|---|---|
| 3,923,619 | 12/1975 | DePoorter et al. | 423/253 X |
| 4,005,042 | 1/1977 | Dada | 423/260 X |
| 4,117,083 | 9/1978 | Maas, Jr. | 423/253 |
| 4,120,936 | 10/1978 | DeLuca et al. | 423/261 |
| 4,397,824 | 8/1983 | Butler et al. | 423/253 X |

Primary Examiner—Edward A. Miller
Assistant Examiner—Matthew A. Thexton
Attorney, Agent, or Firm—Edward J. Brenner

[57] ABSTRACT

A process for manufacturing uranium oxide powder from $UF_6$ which comprises converting $UF_6$ to $UO_2F_2$ by its reaction with excess alcohol in gas phase and further converting the formed $UO_2F_2$ to uranium oxide by combusting hydrocarbon formed in the gas phase reaction and the excessive part of alcohol with oxygen containing gas supplied separately and supplying a regulated amount of steam separately to the combustion reaction zone.

6 Claims, 1 Drawing Figure

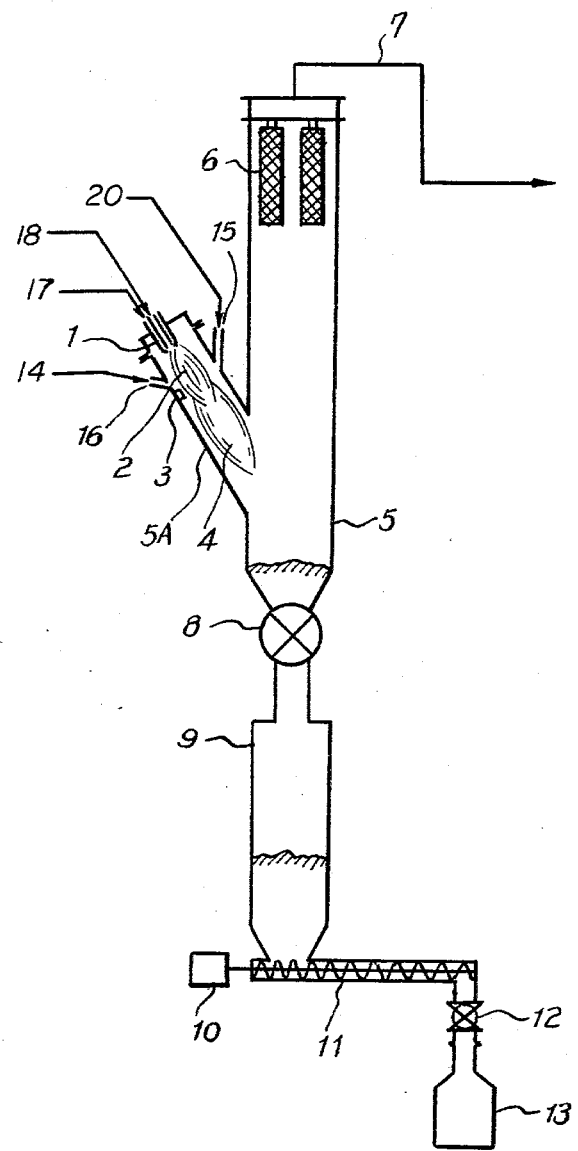

PROCESS FOR MANUFACTURING URANIUM OXIDE POWDER

BACKGROUND OF THE INVENTION

A present invention relates to a process for manufacturing uranium oxide powder from $UF_6$ using a dry conversion, which is low in fluorine contaent and high in activity.

As conventional processes which manufacture uranium oxide from $UF_6$ as a starting material by gas phase reaction, there are known two processes, that is, a process which reacts $UF_6$ with steam and gydrogen gas at high temperatures and another process which manufactures uranium oxide from $UF_6$ in the presence of the flame ignited by hydrogen gas and oxygen gas. The former is described in Japanese Patent Publication No. 18658 of 1961, Japanese Patent Laid Ipen No. 92124 of 1981 (U.S. Pat. No. 4397824), and the latter is described in Japanese Patent Publication No. 10095 of 1966, Japanese Patent Publication No. 24998 of 1976 (U.S. Pat. No. 3796672 Japanese Patent Publication No. 16976 of 1980. These processes are called a dry conversion process because of their manufacturing uranium oxide by gas phase reaction, while another process which comprises hydrolyzing $UF_6$ to $UO_2F_2$ solution, adding ammonia or ammonia and $CO_2$ gases to the $UO_2F_2$ solution to form ADU or AUC and manufacturing uranium oxide from ADU or AUC is called a wet conversion process.

The conversion process which reacts $UF_6$ with steam and hydrogen gas at high temperature is mainly due to the following reaction machanism.

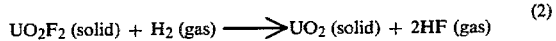

But, it is known that these reactions are accompanied by many side reactions at the same time and that $UF_4$ is formed partly. Therefore, it is also known that the uranium dioxide powder obtained by the gas phase reaction is relatively high in fluorine content. Further, these reactors must be heated up to high temperatures because $UF_6$ reacts with steam and hydrogen gas at the high temperatures.

On the other hand, the process which manufactures uranium oxide powder from $UF_6$ in the presence of the flame ignited by hydrogen gas and oxygen gas is mainly due to the following reaction mechanism.

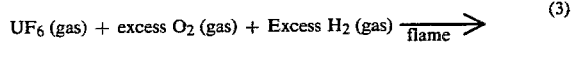

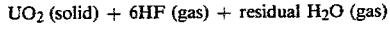

In this reaction, when the ratio of oxygen to hydrogen is more excessive, $U_3O_8$ rich composotion is formed. This gas phase reaction is required to maintain the hydrogen flame of the range of 600° to 900° C. Therefore, a considerably excessive amount of hydrogen gas, in addition to the gas volume required for the conversion from $UF_6$ to $UO_2$, is required and temperature of 600°-900° C. can be maintained by combustion of the excessive hydrogen gas.

The reason why the temperature above 600° C. is required in this reaction is thought to be due to a slow rate of the reaction of $UF_6$ with hydrogen and requirement of a considerable amount of activating energy. Further, it is known that the uranium oxide obtained by this gas phase reaction is higher in fluorine content than the uranium oxide obtained by the conventional wet conversion process.

As the uranium oxide powder obtained by the conventional dry conversion process is relatively high in fluorine content, it has a undesirable effect for manufacturing uranium dioxide pellet.

In the process that $UF_6$ reacts with steam and hydrogen at high temperatures, the reactor is required to be heated internally. In the process which manufactures uranium oxide powder in the presence of the flame ignited by hydrogen and oxygen, considerably excessive hydrogen gas is required for $UF_6$ to maintain the temperature of the reaction zone at 600°-900° C.

It is known that $UF_6$ reacts violently with alcohol to form HF, hydrocarbon and $UO_2F_2$ or $UF_4$. This reaction proceeds much faster than the reaction of $UF_6$ with hydrogen gas.

Further, it is known that this reaction proceeds fast at ordinary temperatures and is exothermic, while the reaction of $UF_6$ with hydrogen gas proceeds slowly even at 600° C. The present invention is based on these facts as stated above.

BRIEF SUMMARY OF THE INVENTION

An object of the present invention is to provide a process for manufacturing uranium oxide powder from $UF_6$ by gas phase reaction in which an uranium oxide powder manufactured is low in fluorine content.

Another object of the present invention is to provide a process for manufacturing uranium oxide powder from $UF_6$ by gas phase reaction in which an uranium oxide powder manufactured is high in activity.

A further object of the present invention is to provide a process for manufacturing uranium oxide powder from $UF_6$ by gas phase reaction in which an uranium oxide powder manufactured is a remarkably suitable raw material for uranium dioxide pellet and nuclear fuel.

According to the present invention, there is fundamentally provided a process for manufacturing uranium oxide powder from $UF_6$ which comprises converting $UF_6$ to $UO_2F_2$ by reaction of said $UF_6$ with excess alcohol in gas phase and further converting said formed $UO_2F_2$ to uranium oxide by combusting hydrocarbon thus formed in said gas phase reaction and said excessive part of alcohol with oxygen containing gas supplied separately.

In the present invention, the fundamental construction thereof described above can be added with a step of introducing a regulated amount of steam supplied separately to the combustion reaction zone for controlling the temperature thereof.

BRIEF DESCRIPTION OF THE DRAWING

The drawing shows apparatus in side view suitable for carrying out a preferred embodiment of the invention.

DETAILED DESCRIPTION OF THE INVENTION

In the present invention, as alcohol which reacts with $UF_6$, methyl alcohol, ethyl alcohol, propyl alcohol, isopropyl alcohol, buthyl alcohol, isobutyl alcohol and higher alcohols can be used. But the higher the alcohol is, the more the reaction mechanism becomes complex, and the combustibility of hydrocarbon, a reaction product of the reaction of $UF_6$ with alcohol becomes worse. Therefore, lower alcohols such as methyl alcohol, ethyl alcohol, propyl alcohol, isopropyl alcohol are preferable. As the boiling points of these lower alcohols are in the range of 64.1° C.–97.4° C., it is favorable to evaporate such lower alcohols to react with $UF_6$ gas.

The reactions of $UF_6$ with these alcohols are shown by the following reaction formulas (4)–(6), but it is known that in these reactions, $HF_4$ is formed partly.

$$UF_6 \text{ (gas)} + 2CH_3OH \text{ (gas)} \longrightarrow \quad (4)$$
$$UO_2F_2 \text{ (solid)} + 4HF \text{ (gas)} + C_2H_4 \text{ (gas)}$$

$$UF_6 \text{ (gas)} + 2C_2H_5OH \text{ (gas)} \longrightarrow \quad (5)$$
$$UO_2F_2 \text{ (solid)} + 4HF \text{ (gas)} + 2C_2H_5 \text{ (gas)}$$

$$UF_6 \text{ (gas)} + 2C_3H_7OH \text{ (gas)} \longrightarrow \quad (6)$$
$$UO_2F_2 \text{ (solid)} + 4HF \text{ (gas)} + 2C_3H_6 \text{ (gas)}$$

For reacting $UF_6$ with alcohol in gas phase, it is preferable to use a binary fluid nozzle. In this case, it is required to make a gas linear velocity of $UF_6$ gas to be comparatively large at the end of the nozzle to prevent blockade from forming due to $UO_2F_2$, a reaction product.

The amount of alcohol required for reaction with $UF_6$ is at least demanded 2 fold of equivalent, as also shown by the chemical formulas (4)–(6) described above, in the gaseous state heated up to the same temperature as that of $UF_6$. But for proceeding completely the reaction with $UF_6$, alcohol of 1.05–1.25 fold of reaction equivalent is required for $UF_6$. In this case, when the excessive amount of alcohol is too more than the reaction equivalent, the temperature of the flame in combustion becomes too higher, consequently the activity of the obtained uranium oxide powder is decreased, and the amount of alcohol which combusts wastefully becomes larger uneconomically.

The $UF_6$ gas and the alcohol gas are blown out through the binary fluid nozzle and a spindle-shaped reaction zone of these gases is formed in front of the head of the nozzle. Excess air or oxygen gas is supplied to the latter half part of the spindle-shaped reaction zone to ignite an ignition device to make a flame-shaped second reaction zone formed.

In the second reaction zone, the excessive amount of the alcohol and the hydrocarbon as ethylen formed in the first reaction zone are combusted and this heat of combustion converts $UO_2F_2$ powder and a very small amount of $UF_4$ powder formed in the first reaction zone to uranium oxide powder.

In the present invention, the flame-shaped second reaction zone is formed by combusting the hydrocarbon as ethylene and the excessive amount of the alcohol, while in the conventional process which manufactures uranium oxide powder in the existence of the flame, the flame is formed by combusting an excess of hydrogen gas. But, in this conventional process, the heat of combustion of hydrogen is 2,580 Kcal/m³ and according to comparison of this value with 14,116 Kcal/m³ of that of ethylene, 7,749 Kcal/m³ of that of methanol, 14,570 Kcal/m³ of that of ethanol and 21,964 Kcal/m³ of that of propanol, the heat of combustion of hydrogen is $\frac{1}{3}-\frac{1}{8}$ of these heats of combustion, therefore a considerably excessive amount of hydrogen is required for $UF_6$ to keep the temperature of the flame at 600° C.–900° C.

In the present invention, 1.05–1.25 fold of the reaction equivalent of alcohol is sufficient for $UF_6$. Even in this case, the temperature of the flame zone is kept to be in the range of 800° C.–1000° C.

Then, in the present invention, the steam of 110° C.–150° C. is supplied to the flame zone to control the temperature of the flame zone at 600° C.–800° C. and to make activity of the uranium oxide formed suitable for manufacturing of uranium dioxide pellet.

When the temperature of the flame zone is high, the activity of the uranium oxide powder is decreased due to sintering thereof.

In the present invention thus, by supplying steam for controlling the temperature of the flame zone, the fluorine contained in the uranium oxide can be removed as HF, and by oxidizing in the atmosphere containing the evaporated alcohol, defluorination can be promoted. Therefore, the obtained uranium oxide is considerably lower in fluorine content than that of the conventional dry convertion process.

As in the present invention, the uranium oxide powder obtained in this way is $U_3O_8$ powder, it is required to be reduced by hydrogen in a rotary kiln or a fluidized bed known to those skilled in the arts for obtaining uraium dioxide powder suitable for nuclear fuel.

The present invention, as described above, provides a process which can manufacture economically uranium oxide powder containing an extremely low amount of fluorine in keeping the activity of the powder, and is useful for manufacturing nuclear fuel.

The drawing shows one example of the reaction apparatus which is used in of the present invention. The apparatus comprises reactor 5, powder receiving hopper 9 which is connected to the reactor 5 by rotary bulb 8, screw feeder 11 which is driven by motor 10 connected to the lower end of hopper 9, and further receiver 13 with rotary bulb 12 connected to screw feeder.

Reactor 5 has combustion cylinder 5A which is installed to the reactor diagonally and downward at the lower half part of the reactor and has sintered metal filters 6 at the top. Gas reaction products pass through filters 6 and also through path 7 to be introduced to waste gas treating apparatus 19.

Combustion cylinder 5A is provided with a binary fluid nozzle for introducing reactants, ignition device 3 (spark device), nozzle 16 for introducing steam 14, and nozzle 15 for introducing oxygen 20. The apparatus is preferably made of Ni base superalloy like Hastelloy. In the drawing, 20 is oxygen gas, 17 is alcohol gas, 18 if $UF_6$ gas and $N_2$ gas and 2 is the first reaction zone.

The present invention will be understood more readily with reference to the following examples. The examples, however, are intended to illustrate the present invention and are not to be construed to limit the scope of the present invention.

EXAMPLE 1

Reactor 5 shown in the drawing is used. From the inside pipe of a binary fluid nozzle 1 is blown out nitrogen gas and from the outside pipe thereof methyl alcohol is blown out and at the same time from nozzle 15 is supplied oxygen gas to ignite an ignition device. When the temperature of reactor 5 reaches about 200° C., UF$_6$ gas of which the flow amount is 123 g UF$_6$/min is blown out, instead of N$_2$ gas at the flow rate of 70 m/sec through the inside pipe of the binary fluid nozzle, and the same time the flow amount of methyl alcohol is determined to be 2.5 fold of the flow amount of the UF$_6$ gas. This means that methyl alcohol corresponding to 1.25 fold of reaction equivalent of UF$_6$ gas is supplied. Consequently, the temperature of the second reaction zone 4 of the flame zone reaches 900° C., and steam of 120° C. is supplied to control the temperature of the second reaction zone to 700° C.

In this way, the reaction proceeds for 15 min., and the U$_3$O$_8$ of 1,450 g is obtained.

Next, the U$_3$O$_8$ is reduced in the hydrogen atmosphere at 630° C. to UO$_2$ powder in a small batch furnace.

The UO$_2$ powder obtained in this way has a mean particle size (Fsss) of 0.65 μm and a specific surface area (BET) of 3.052 m$^2$/g. Further, the fluorine content thereof is 15 ppm.

EXAMPLE 2

The reactor shown the drawing is used. N$_2$ gas and ethyl alcohol are blown out from the binary fluid nozzle 1 and at the same time O$_2$ gas is also supplied to ignite an ignition device 3. When the temperature of the reactor 5 is heated up to about 200° C., UF$_6$ gas of the flow amount of 123 g UF$_6$/min is blown out at the flow rate of 80 m/sec from the inner pipe of the binary fluid nozzle instead of N$_2$ gas and at the same time the flow amount of the ethyl alcohol is made to be 2.1 fold of that of the UF$_6$. This means that ethyl alcohol of 1.05 fold of reaction equivalent for UF$_6$ is supplied. As the result, the temperature of the second reaction zone 4 of the flame zone becomes 1000° C., therefore steam of 120° C. is supplied to control the temperature of the second reaction zone 4 to 800° C.

After the reaction proceeds for 17 min., there is obtained U$_3$O$_8$ of 1,640 g.

Next the U$_3$O$_8$ is reduced in hydrogen atmosphere at 650° C. using a small batch furnace to UO$_2$ powder. The UO$_2$ powder obtained in this way has a specific surface area (BET) of 2.65 m$^2$/g and a mean particle size (Fsss) of 0.68 μm. Further, the fluorine content thereof is 8 ppm.

EXAMPLE 3

The reactor shown in the drawing is used. N$_2$ gas and propyl alcohol is blown out from the binary fluid nozzle 1, and at the same time oxygen gas is also supplied to ignite an ignition device.

When the temperature of the reactor 5 becomes about 200° C., instead of N$_2$ gas, UF$_6$ gas of a flow amount of 123 g UF$_6$/min. is blown out at the flow rate of 80 m/sec. At the same time the flow amount of propyl alcohol is determined to be 2.1 fold of the flow amount of UF$_6$ gas. This means that the 1.05 fold of reaction equivalent of propyl alcohol is applied to UF$_6$.

In the result, the temperature of the second reaction zone 4 of the flame zone becomes 1,200° C., so the temperature of the second reaction zone 4 is kept to be 800° C. by supplying steam of 120° C. Thus, after the reaction of 20 min., there is obtained U$_3$O$_8$ of 1,905 g.

Next, the U$_3$O$_8$ is reduced in hydrogen atmosphere at 650° C. to UO$_2$ powder, by using a small batch furnace. The UO$_2$ powder obtained in this way has a mean particle size (Fsss) of 0.70 μm and a specific surface area (BET) of 2.51 m$^2$/g.

Further, the fluorine content thereof is 5 ppm.

What is claimed is:

1. A process for manufacturing uranium oxide powder from UF$_6$ which comprises converting UF$_6$ to UO$_2$F$_2$ by its reaction with excess alcohol in gas phase and further converting said formed UO$_2$F$_2$ to uranium oxide by combusting hydrocarbon formed in said gas phase reaction and said excessive part of alcohol with oxygen containing gas supplied separately.

2. A process for manufacturing uranium oxide powder from UF$_6$ which comprises converting UF$_6$ to UO$_2$F$_2$ by its reaction with excess alcohol in gas phase and further converting said formed UO$_2$F$_2$ to uranium oxide by combusting hydrocarbon formed in said gas phase reaction and said excessive part of alcohol with oxygen containing gas supplied separately and supplying a regulated amount of steam separately to said combustion reaction zone.

3. A process for manufacturing uranium oxide powder from UF$_6$ as claimed in claim 1 or 2, wherein said alcohol is a lower alcohol having the number of carbon atom up to 3.

4. A process for manufacturing uranium oxide powder from UF$_6$ as claimed in claim 1 or 2, wherein the amount of said alcohol used is in the range of 1.05–1.25 fold of reaction equivalent.

5. A process for manufacturing uranium oxide powder from UF$_6$ as claimed in claim 1 or 2, wherein said UF$_6$ and said alcohol are blown out through a binary fluid nozzle.

6. A process for manufacturing uranium oxide from UF$_6$ as claimed in claim 2, wherein the temperature of said combustion reaction zone is regulated to the range of 600° to 800° C. by introduction of said steam.

* * * * *